Dec. 1, 1970  W. E. RUSHTON  3,544,269
METHOD FOR PRODUCING DEFLUORINATED PHOSPHORIC ACID
Filed Feb. 27, 1967  3 Sheets-Sheet 1
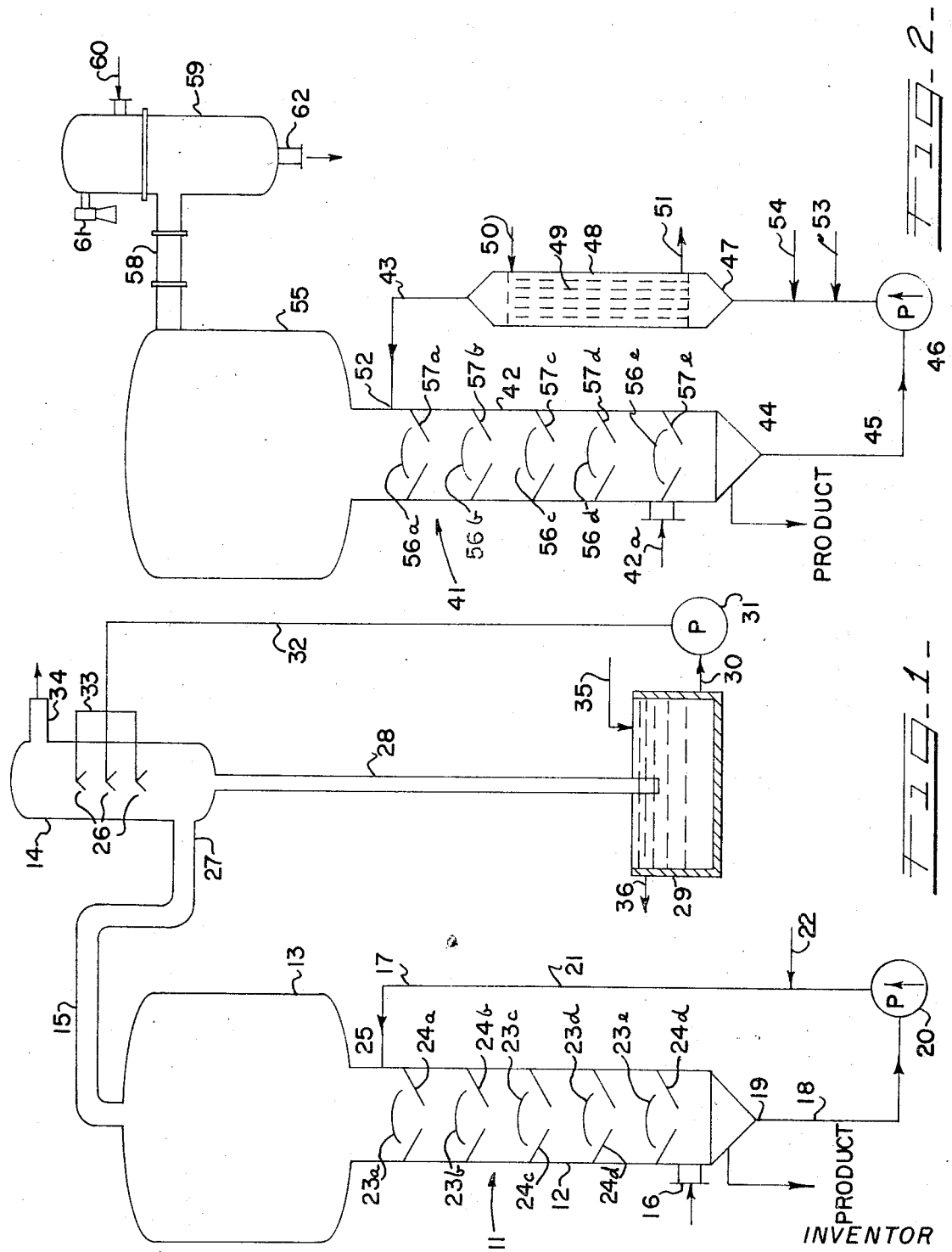
INVENTOR
WILLIAM E. RUSHTON
BY Greist, Lockwood, Greenawalt, & Dewey
ATT'YS.

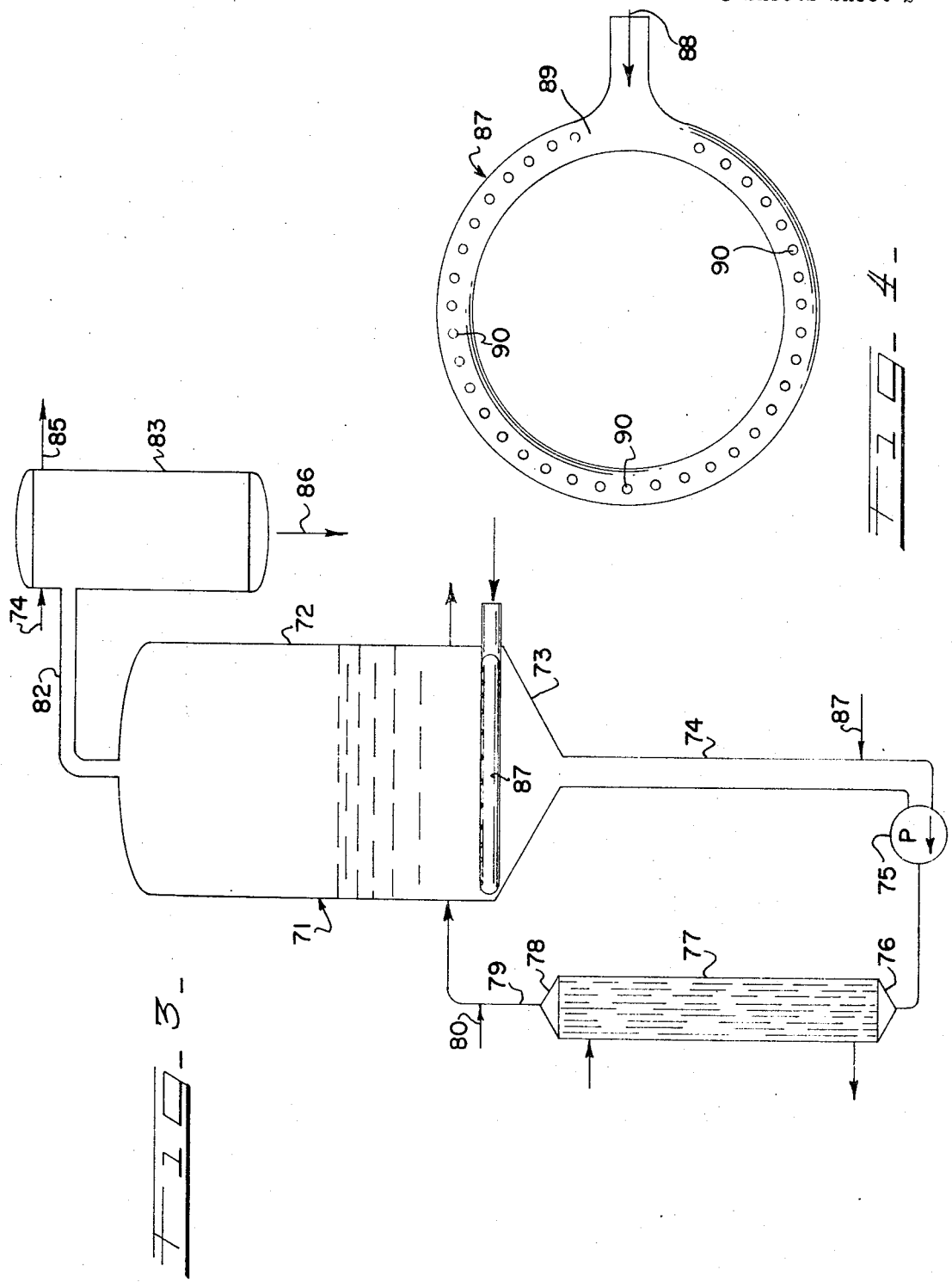

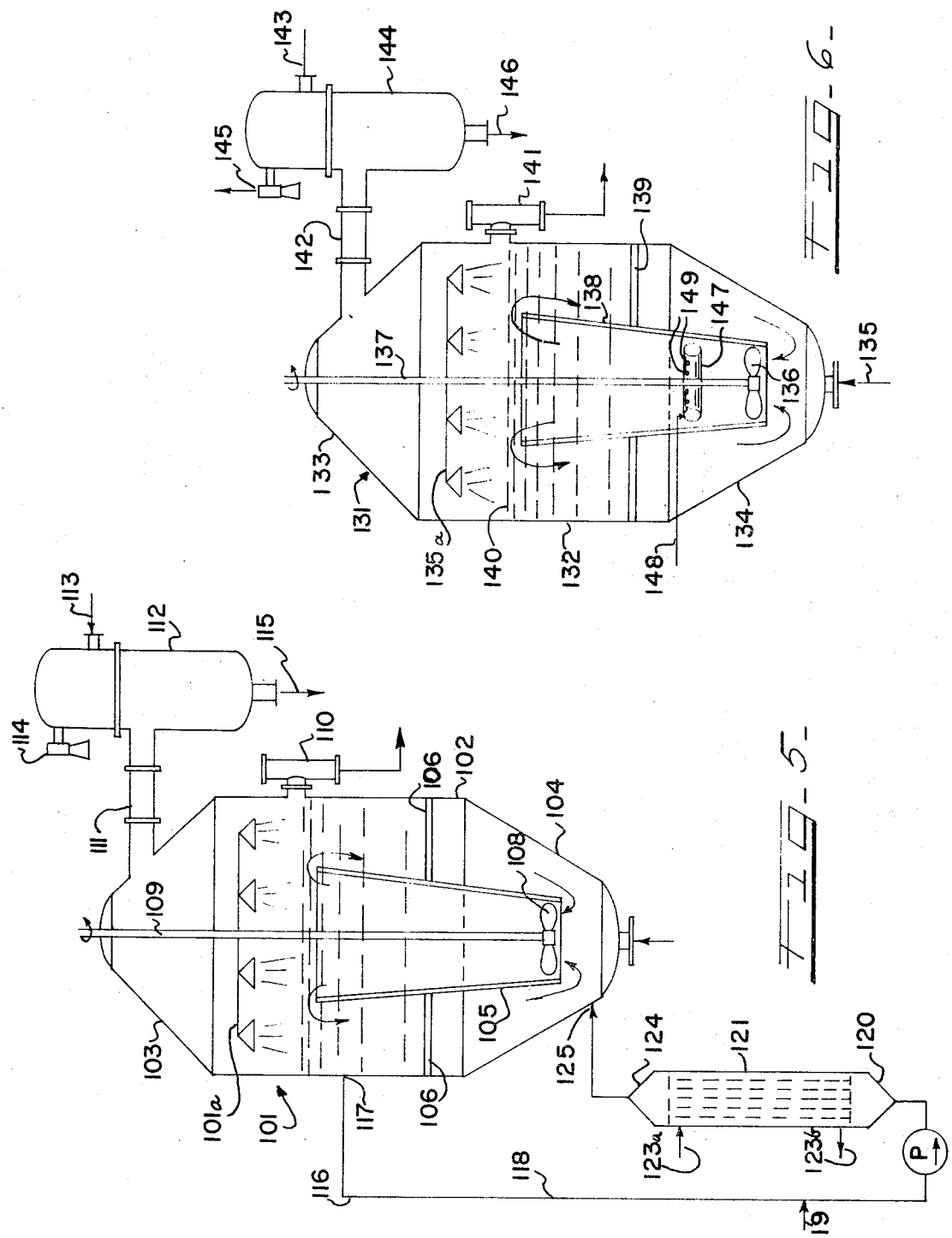

United States Patent Office 3,544,269
Patented Dec. 1, 1970

3,544,269
METHOD FOR PRODUCING DEFLUORINATED PHOSPHORIC ACID
William E. Rushton, South Holland, Ill., assignor to Whiting Corporation, a corporation of Illinois
Filed Feb. 27, 1967, Ser. No. 618,790
Int. Cl. C01b 25/18
U.S. Cl. 23—165            5 Claims

ABSTRACT OF THE DISCLOSURE

A method and apparatus for defluorinating wet process phosphoric acid containing undesirable amounts of fluorine wherein water of dilution is contacted with such phosphoric acid in a vessel maintained under vacuum and at a temperature sufficient to keep the water of dilution in a vapor state.

---

The present invention generally relates to the defluorination of wet process phosphoric acid and, more particularly, concerns a novel method and apparatus for producing a wet process phosphoric acid product having a substantially reduced fluorine content.

In the manufacture of phosphoric acid by the wet process method, phosphate rock is reacted with sulfuric acid. Since most phosphate rock contains between 3% and 4½% fluorine, usually in the form of calcium fluoride, a series of reactions occur resulting in the production of hydrogen fluoride, silicon tetrafluoride and fluosilicic acid. It is believed that these reactions proceed in accordance with the equations set forth below:

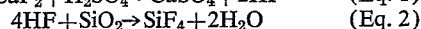
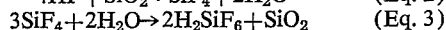
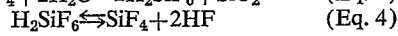

$$CaF_2 + H_2SO_4 \rightarrow CaSO_4 + 2HF \quad \text{(Eq. 1)}$$
$$4HF + SiO_2 \rightarrow SiF_4 + 2H_2O \quad \text{(Eq. 2)}$$
$$3SiF_4 + 2H_2O \rightarrow 2H_2SiF_6 + SiO_2 \quad \text{(Eq. 3)}$$
$$H_2SiF_6 \rightleftharpoons SiF_4 + 2HF \quad \text{(Eq. 4)}$$

In a conventional wet process phosphoric acid plant wherein phosphate rock is first reacted with sulfuric acid to produce a dilute phosphoric product having a 30% $P_2O_5$ concentration, approximately 5% of the fluorine originally present in the phosphate rock is evolved with the vapors from the reaction slurry and approximately 28% of such fluorine ends up in the gypsum cake. Normally, the dilute acid product from the reactor is then concentrated in an evaporator to produce a concentrated acid having a 54% $P_2O_5$ concentration. Approximately 42% of the fluorine originally present in the phosphate rock is evolved with the vapor product from the evaporator and the remaining 25% of such fluorine becomes a part of the final 54% $P_2O_5$ acid product.

The wet process phosphoric industry generally refers to the fluorine content of a phosphoric acid product in terms of the P/F value (pounds of phosphorous per pound of fluorine). In this regard, the P/F value for conventionally made phosphoric acid having a $P_2O_5$ concentration of approximately 54% is around 15. Similarly, the P/F value for a concentrated phosphoric acid product, one having a $P_2O_5$ concentration of around 72%, is about 80.

Certain users of phosphoric acid require that it be defluorinated. One of the major uses of defluorinated acid is as an animal feed supplement. In order to be acceptable for use in the production of animal feed, it is preferred that the P/F value be at least 125. Accordingly, as is apparent from the above data, conventionally made phosphoric acid does not meet the preferred requirements of the animal feed users. A second and important use of defluorinated phosphoric acid is in the production of triple superphosphate. One of the serious problems of triple superphosphate occurs as a direct result of the evolution of fluorine vapors in the triple superphosphate storage dens. In order to minimize air pollution, the gases which exit from these buildings are scrubbed for recovery of the fluorine present in the vapor form. Accordingly, in this connection, an important advantage of a defluorinated acid product of the present invention is the substantial reduction in fluorine evolved from such triple superphosphate storage dens.

In accordance with the present invention, it has been discovered that the fluorine concentration of a wet process phosphoric acid product can be substantially reduced by first diluting the acid with water, either in the form of steam or as a liquid, followed by evaporation of the water of dilution. The amount of water added is that which, under equilibrium conditions, will remove the desired amount of fluorine from the acid product.

It is important to note that mere evaporation of the acid is not adequate for reducing the fluorine content to the desired level. For example, as was previously noted, in concentrating a 54% $P_2O_5$ acid, having a P/F value of approximately 15, to produce superacid (72% $P_2O_5$) the P/F value is only increased to 80.

As will be apparent from the detailed description of this invention, the techniques thereof can be applied to all aspects of phosphoric acid production. For example, the fluorine removal can be accomplished both in the reactor and the evaporator. Similarly, if desired, fluorine removal can be accomplished in a separate steam stripping tower either immediately following the production of the dilute acid in the reactor or, more preferably, following the concentration of the acid in the evaporator.

It is, therefore, an important object of the present invention to provide a new and improved method and apparatus for producing defluorinated wet process phosphoric acid.

Another object of the present invention is to provide a method for reducing the fluorine content of wet process phosphoric acid which involves first introducing water, in a liquid or vapor form, into the wet process phosphoric acid followed by supplying heat to the thus diluted acid in an amount sufficient to vaporize the water of dilution.

Another object of the present invention is to provide a new and improved method for reducing the fluorine content of wet process phosphoric acid which involves the step of treating the wet process phosphoric acid in a steam stripping column.

Another object of the present invention is to provide a new and improved evaporator method and apparatus for reducing the fluorine content of wet process phosphoric acid while simultaneously concentrating the same.

Another object of the present invention is to provide a novel method for reducing the fluorine content of wet process phosphoric acid while simultaneously concentrating the same which method involves feeding a wet process phosphoric acid feed to an evaporator and adding a predetermined amount of water thereto while simultaneously increasing the heat input to said evaporator to vaporize the added water of dilution along with the water present in said feed to provide a defluorinated and concentrated phosphoric acid product.

Another object of the present invention is to provide a novel reactor method and apparatus for producing a wet process phosphoric acid product having a reduced fluorine content.

Another object of the present invention is to provide a novel reactor method for the production of wet process phosphoric acid having a reduced fluorine content which reactor method involves diluting the reaction slurry present in the reactor system with a predetermined amount of water followed by the supplying of heat to said surry in an amount sufficient to vaporize the water of dilution.

Other and further objects of the present invention will be apparent from the following detailed description taken in conjunction with the accompanying drawings wherein:

FIG. 1 is a schematic flow diagram illustrating a steam stripping column embodying principles of the present invention for the defluorination of wet process phosphoric acid;

FIG. 2 is a schematic flow diagram of another steam stripping column also embodying principles of the present invention;

FIG. 3 is a schematic flow diagram illustrating an evaporator embodying principles of the present invention for simultaneously defluorinating and concentrating wet process phosphoric acid;

FIG. 4 is a plan view of the steam sparge shown in the evaporator of FIG. 3;

FIG. 5 is a schematic flow diagram of a phosphoric acid reactor embodying principles of the present invention for the production of wet process phosphoric acid having a reduced fluorine content; and FIG. 6 is a schematic flow diagram of another reactor embodiment made in accordance with the principles of the present invention.

In the embodiment illustrated in FIG. 1 a steam stripper 11 includes a stripping column 12 upon which an entrainment separator 13 is mounted in overlying concentric relation. A scrubbing tower 14 is in open communication with entrainment separator 13 through overhead vapor line 15.

As is shown, stripping column 12 includes a steam inlet 16 and recycle loop 17. A first recycle line 18 of recycle loop 17 communicates recycle outlet 19 of column 12 with the suction side of recirculation pump 20. The discharge side of pump 20 is connected to a second recycle line 21 which discharges the recycling liquid phosphoric acid into recycle inlet 25 located in the upper portion of stripping column 12. In the illustrated embodiment the acid feed is introduced into second recycle line 21 on the discharge side of pump 20 as is generally indicated at 22.

Stripping column 12 is provided with a plurality of dished head members 23a–e which respectively cooperate with downwardly tapered annular deflectors 24a–e to uniformly distribute the downward flow of the liquid phosphoric acid received from recycle inlet 25 and provide uniform contacting of the liquid phosphoric acid with the vapor. Temperature and pressure conditions in column 12 are maintained so as to insure that the steam introduced in the column 12 will not be converted to liquid water. For example, column 12 is preferably operated under vacuum conditions so that steam entering at 212° F. and 0 p.s.i.g. immediately becomes superheated.

As is shown, the liquid phosphoric acid entering at recycle inlet 25 first contacts dished head member 23a and from there drops to tapered deflector member 24a which in turn directs the liquid acid onto the center portion of dished head member 23b. Simultaneously, steam is introduced at the lower portion of the column through steam inlet 16 and travels upwardly through the acid flow in countercurrent relation therewith. This affords good contact of the steam vapors with the liquid phosphoric acid and, in accordance with the present invention, effects a transfer of equilibrium amounts of the fluorine compounds present in the liquid acid to the steam vapor. Accordingly, by increasing the amount of steam introduced into the system, greater amounts of fluorine can be recovered from the liquid phosphoric acid.

As the vapors exit past dished head member 23a, they are received in the entrainment separator 13 which, by reason of its greatly enlarged volume, results in a substantial velocity reduction causing the entrained liquid to be released from the vapors and returned to column 12. Vapors leaving entrainment separator 13 travel into overhead vapor line 15 and, in the embodiment illustrated in FIG. 1, are received in scrubbing tower 14 which is equipped with a plurality of spraying nozzles 26 positioned so that they will discharge the scrubbing liquid onto the vapors which enter the scrubbing tower 14 through an inlet 27. As is shown, inlet 27 is preferably positioned adjacent the bottom of scrubbing tower 14 so that the vapors rise in countercurrent relationship to the discharge flow of scrubbing liquid from the nozzles. As the fluorine compounds and the water vapor are scrubbed, the scrubbing liquid absorbs the gaseous fluorine compounds and is then discharged via scrubbing tower discharge line 28 into a sump 29. Recycle flow from sump 29 exits at recycle outlet 30 into the suction side of a recycle pump 31 which communicates with scrubbing tower nozzles 26 by recycle line 32 and header 33. An entrainment separator (not illustrated) for removing entrained liquid from the vapors exiting through vapor outlet 34 can be used to collect the entrained liquid and return the same to the sump 29.

Makeup water is introduced at feed inlet 35 to dilute the fluosilicic acid recycle liquor while the overflow from the sump 29 discharges through overflow outlet 36 to further processing in accordance with conventional techniques in this art. If desired, a suitable float control means (not illustrated) can be provided to regulate the flow of makeup water into sump 29.

It is important to note that the scrubbing tower arrangement described above is not essential to the practice of the present invention. Such an arrangement, however, offers the advantage of enabling the recovery of fluorine and allows for the reuse of steam, thereby reducing operating costs for the system.

In the steam stripper embodiment 41 illustrated in FIG. 2, a stripping column 42 is constructed along the same general lines as that of the FIG. 1 embodiment with the exception that in the embodiment shown in FIG. 2 the phosphoric acid is also diluted with water and then heated sufficiently in heated recycle loop 43 to vaporize the water of dilution. As is shown, steam is introduced in the column 42 through a steam inlet 42a while liquid phosphoric acid simultaneously exits the column at recycle outlet 44 into a first recycle line 45 which communicates with the suction side of an axial flow pump 46. The pump 46 communicates with the inlet header 47 of heat exchanger 48 which is equipped with a plurality of heat exchanger tubes 49. The shell side of heat exchanger 48 receives steam through steam inlet 50 and discharges the same through condensate outlet 51. The heated recycling acid is then discharged into the upper portion of stripping column 42 at recycle inlet 52.

In this embodiment of the present invention, water is also introduced into the recycle flow stream as shown generally at 53 either prior to, simultaneously with, or subsequent to the introduction of the acid feed, generally indicated at 54. The amount of heat supplied to the shell side of heat exchanger 48 should be sufficient to vaporize the water of dilution added to the system under the temperature and pressure conditions maintained in column 42. In this manner, equilibrium concentrations of the fluorine compounds contained in the wet process phosphoric acid are picked up by the vaporizing water of dilution and discharged together with the exiting vapor into entrainment separator 55 which is in overlying relationship and direct communication with stripping column 42. As is shown, column 42 is provided with a plurality of dished head members 56a–e and downwardly tapered annular deflectors 57a–e comparable to dished head members 23a–e and deflectors 24a–e of the FIG. 1 embodiment.

The exiting vapors travel through an overhead vapor line 58 and are discharged into a barometric condenser 59 which includes a water inlet 60, steam ejector 61, and condensate discharge outlet 62. It should be noted that the scrubbing tower arrangement previously described in connection with the embodiment of FIG. 1 can be used as an alternative to the condenser unit 59. Similarly, if desired, a suitable barometric condenser could be used as a replacement for the scrubbing tower 14 in the FIG. 1 embodiment.

Accordingly, this embodiment illustrates the conjoint use of steam and water in a single stripping column. In this regard, it should also be noted that the use of liquid water in the fluorination of superphosphoric acid is preferred since the superphosphoric acid does not readily accept and mix with water from steam.

The principles of the present invention can also be applied to a forced circulation evaporator wherein a dilute wet process phosphoric acid product can be simultaneously concentrated and defluorinated. FIG. 3 illustrates a schematic flow diagram of such a single stage forced circulation evaporator system 71 which includes an evaporating chamber 72 having a frusto-conical bottom 73 which tapers into a recycle flow line 74. A centrifugal pump 75 provides forced circulation of the recycle liquor and discharges the same into the inlet header 76 of heat exchanger 77 and the tube outlet header 78 communicates with the interior of evaporating chamber 72 through recycle inlet line 79.

The liquid head created by tube outlet header 78 and recycle inlet line 79 maintains the heated liquid in the heat exchanger 77 in a liquid condition. Accordingly, the heated fluid upon being discharged into the interior of evaporating chamber 72 immediately flashes to produce a vapor phase and fluid phase containing equilibrium concentrations of the fluorine compounds, phosphoric acid and water vapor. Preferably, evaporating chamber 72 is maintained under vacuum conditions at an absolute pressure of between 2 and 10 inches of mercury. If desired, the single unit system 71 shown in FIG. 3 can be operated either separately or in series with similar units to provide multistage evaporation and defluorination of wet process phosphoric acid.

In the illustrated embodiment, the acid feed is discharged into the recycle inlet line 79 as is generally shown at 80 and the water of dilution is fed into recycle outlet line 74 on the upstream side of centrifugal pump 75 as generally designated by the reference numeral 81. If desired, water can be both added simultaneously with the acid feed 80 and separately thereto. In accordance with the present invention, the heat input to heat exchanger 77 is increased sufficiently to insure vaporization of the added water of dilution. Accordingly, the heat input to the system should be sufficient to enable both evaporation of the water of dilution and concentration of acid feed.

Water added to the system will, upon being vaporized in the evaporating chamber 72, carry with it equilibrium concentrations of the fluorine compounds, particularly HF and $SiF_4$. These vapors will exit through overhead vapor line 82 and will then be discharged directly into a condenser 83 equipped with a water inlet 74, steam ejector 85 and condensate discharge outlet 86.

If desired, the embodiment shown in FIG. 3 can be equipped with the steam sparge 87 for directly introducing steam into the liquid phosphoric acid in the evaporating chamber 72. As is best illustrated in FIG. 4, steam sparge 87 includes a steam inlet 88 which is adapted to be connected to a suitable supply source which generally will provide steam at 0 p.s.i.g. and 212° F. Steam entering the inlet 88 is directed into a hollow annular body portion 89 equipped with a plurality of steam discharge jets 90 which are preferably equidistantly spaced around the upper peripheral portion of the annular body 89. In this manner, the steam is bubbled through the body of liquid maintained in evaporating chamber 72 and acts to liberate the fluorine compounds contained therein in accordance with the techniques of the present invention. As was noted in the description of the FIG. 2 embodiment, the use of steam is particularly suited to the defluorination of dilute phosphoric acid since the concentrated acid such as, for example, superphosphoric acid having a $P_2O_5$ concentration of 72% or more is substantially more viscous than the dilute phosphoric acid and, as such, does not readily mix with the steam vapors passing therethrough. Alternatively, if desired, the use of a steam sparge can be coupled with the addition of liquid water to the recycle stream to defluorinate the acid product.

While a specific configuration for the steam sparge 89 shown in FIG. 4 is set forth, it should be noted that alternative designs and configurations for this system component can be substituted in place thereof without departing from the practice of the present invention.

FIGS. 5 and 6 illustrate the use of the defluorination techniques of the present invention in a wet process phosphoric acid reactor. In particular in FIG. 5, the reference numeral 101 generally designates a combination wet process phosphoric acid reactor and slurry cooler unit having a fixed diameter midsection 102 which is closed at its upper and lower ends by frusto-conical top and bottom sections 103 and 104. Sulfuric acid is delivered into the reactor-cooler 101 through an overhead spray head 101a onto the surface of the reaction slurry contained therein. A draft tube 105 is coaxially supported in the interior of the reactor-cooler unit 101 by means of a plurality of radial spoke members 106 and has its upper portion terminating somewhat below the normal operating level within reactor unit 101. An impeller 108 is positioned within the draft tube 105 and is adapted to be rotated so that the liquid in the reactor-cooler 101 will be drawn upwardly from the bottom through the draft tube and downwardly along the outside thereof in a generally toroidal flow pattern as is generally indicated by the arrows. Impeller 108 is mounted to the lower end of a drive shaft 109 which is operatively connected to a suitable drive means (not illustrated).

Slurry level in the reactor is maintained by an overflow device 110 which discharges the overflow liquid by gravity for further processing such as, for example, to a filter feed tank or like processing equipment in accordance with known techniques in this art. Vapors emitted from the slurry contained in the reactor-cooler 101 are transmitted through the vapor overhead connection 111 to a condenser 112 having a cold water inlet 113, steam ejector 114 and condensate discharge outlet 115.

In accordance with the present invention, the combination reactor-cooler 101 is equipped with a heated recycle loop 116. As is shown, reactor-cooler 101 has a recycle outlet 117 which communicates with a recycle line 118. Water from a suitable supply source is discharged and admixed with the recycling acid slurry at 119 which is then pumped into the inlet header 120 of a heat exchanger 121 by means of a pump 122. Heat exchanger 121 receives steam on its shell side through steam inlet 123a and is equipped with a condensate discharge outlet 123b. The diluted phosphoric acid is heated in the heat exchanger 121 to an extent sufficient to permit vaporization of the water of dilution at the temperature and pressure conditions maintained within reactor-cooler 101. The heated and diluted recycle stream is then discharged from outlet header 124 of heat exchanger 121 into the reactor-cooler 101 as shown at 125. The added water of dilution is then evaporated from the slurry and transmitted to the condenser along with the vaporized fluorine compounds as described above.

In operation, ground phosphate rock and recycle phosphoric acid are discharged into the inlet of reactor-cooler 101 at feed inlet 101b while sulfuric acid is simultaneously introduced therein through spray head 101a. The reaction slurry formed of these reactants is subjected to high turbulence principally developed by impeller 108. Reactor-cooler 101 is preferably operated under vacuum with a liquid level 126 maintained therein. Continuously during operation of the reactor, a portion of the acid slurry is recycled through outlet 117 into recycle line 118 wherein it is admixed with water as shown at 119 and subsequently heated in heat exchanger 121 to a temperature at which the water of dilution will vaporize at pressure conditions maintained in the interior of reactor-cooler 101. In this manner, the amount of fluorine-carrying vapors exiting to condenser 113 will be substantially increased with a corresponding decrease in the fluorine concentration of the acid slurry.

In the embodiment of the present invention illustrated in FIG. 6, the reference numeral 131 generally designates a reactor-cooler of the same general type as that shown and described in connection with FIG. 5 with the exception that reactor-cooler 131 substitutes steam injection for the water dilution techniques of the previously described embodiments. In particular, reactor-cooler 131 includes a fixed diameter midsection 132 which is closed off at its upper and lower ends by frusto-conical top and bottom sections 133 and 134. Phosphate rock and recycle phosphoric acid are introduced at feed inlet 135 and are immediately subjected to high turbulence created by impeller 136 fixed to drive shaft 137. Sulfuric acid is introduced into the turbulent reaction slurry through overhead spray 135a. Combination reactor-cooler 131 is provided with a draft tube 138 which is fixed to midsection 132 by a plurality of radial spoke members 139. The upper end of draft tube 138 terminates below the normal operating liquid level 140 and enables the acid slurry to rise upwardly through draft tube 138 and downwardly along the outside thereof in a toroidal flow pattern as is generally indicated by the arrows in FIG. 6. An overflow device 141 serves to maintain the liquid level at the desired level. Vapors evolved from the slurry are discharged into a vapor line 142 and condensed in a barometric condenser 143 which is equipped with a cold water inlet 144, steam ejector 145 and condensate discharge outlet 146.

In accordance with an important aspect of the present invention, the reactor-cooler 131 is equipped with a steam sparge 147 located within draft tube 138. Steam from a suitable source 148 is fed into steam sparge 147 and discharged therefrom through the acid slurry by means of a plurality of steam jets 149. As was true with the previously described embodiments, the use of a steam sparge is preferred with the more dilute acids since the concentrated acids are more viscous and not readily diluted with the steam vapors. Such vapors will merely bubble through the concentrated acid liquid without mixing therewith. If desired, the steam sparge 147 can be incorporated in the embodiment of the present invention illustrated in FIG. 5 to provide a reactor which both receives liquid water of dilution as well as steam.

The following detailed working example describes the defluorination system 11 of FIG. 1 and will serve to further illustrate the nature of this invention.

EXAMPLE

A steam stripper of the same general design as that shown in FIG. 1 and designated by the reference numeral 11 would be equipped with an entrainment separator 13 mounted thereover having a height of 10 feet and diameter of 19 feet. An overhead vapor line of 4 feet in diameter would communicate the entrainment separator with a scrubbing tower which would be 19 feet in diameter and have a height of 20 feet.

In operation, the column would be operated at an absolute pressure of approximately 2 inches of mercury and the liquid acid maintained at a temperature of about 185° F. In a typical 52% $P_2O_5$ acid, the pounds of phosphorous and pounds of fluorine per pound of acid feed would be 0.325 and 0.015, respectively, thereby providing a P/F value of approximately 15.7. Experimental data have indicated that 5.5 pounds of water vapor will be required per pound of $P_2O_5$ at 52% $P_2O_5$ to produce a product having a P/F value of approximately 125.

Accordingly, in a stripper which receives 11,750 pounds per hour of phosphoric acid product having a 52% $P_2O_5$ concentration, approximately 36,850 pounds of steam at 0 p.s.i.g. and 212° F. should be supplied to the stripper to provide a 52% $P_2O_5$ acid product having a P/F value of 125.

I claim:

1. The improved method of removing fluorine from wet process phosphoric acid, said method comprising the steps of maintaining a vessel under vacuum, introducing liquid wet process phosphoric acid containing undesirable amounts of fluorine in said vessel, adding water of dilution to said wet process phosphoric acid, intimately contacting said liquid phosphoric acid in said vessel with said water of dilution to effect a transfer of equilibrium amounts of fluorine from said liquid wet process phosphoric acid, maintaining temperature conditions in said vessel sufficient to keep said water of dilution in a vapor state, said water of dilution being added to said vessel at a rate which, under equilibrium conditions, will remove the desired amount of fluorine from said liquid wet process phosphoric acid.

2. The improved method of claim 1 wherein water of dilution is introduced, in the form of steam, into the lower end of a steam stripping column and passed upwardly therethrough, and said wet process phosphoric acid is introduced into the upper end of said column and passed downwardly therethrough.

3. The improved method of claim 2 wherein said stripping column is maintained under vacuum at an absolute pressure of approximately two inches of mercury and at a temperature of approximately 185° F.

4. The method of claim 1 wherein said vessel is an evaporating chamber which is maintained under a vacuum in a forced circulation evaporator, whereby said liquid wet process phosphoric acid can be simultaneously defluorinated and concentrated.

5. The method of claim 1 wherein said vessel is a combination reactor-cooler unit which is maintained under vacuum and wherein sulfuric acid, phosphate rock and water are simultaneously introduced to produce a reaction slurry, whereby wet process phosphoric acid is simultaneously formed and defluorinated in said vessel.

References Cited

UNITED STATES PATENTS

| | | | |
|---|---|---|---|
| 2,165,100 | 7/1939 | Hettrick | 23—165 |
| 2,962,357 | 11/1960 | Williams et al. | 23—165 |
| 2,987,376 | 6/1961 | Gloss | 23—165 |
| 3,074,780 | 1/1963 | Smalter | 23—165 |
| 3,416,889 | 12/1968 | Caldwell | 23—165 |

HERBERT T. CARTER, Primary Examiner

U.S. Cl. X.R.

23—276, 285; 159—47, 22